United States Patent
Yang

(10) Patent No.: US 6,771,967 B2
(45) Date of Patent: Aug. 3, 2004

(54) METHOD FOR ASSIGNING CHANNEL IN MOBILE COMMUNICATION SYSTEM

(75) Inventor: Hae-Yong Yang, Ichon-shi (KR)

(73) Assignee: Hyundai Electronics Industries, Kyoungki-Do (KR)

( * ) Notice: Subject to any disclaimer, the term of this patent is extended or adjusted under 35 U.S.C. 154(b) by 379 days.

(21) Appl. No.: 09/746,665

(22) Filed: Dec. 22, 2000

(65) Prior Publication Data

US 2001/0014609 A1 Aug. 16, 2001

(30) Foreign Application Priority Data

Dec. 23, 1999 (KR) .......................................... 1999-61248

(51) Int. Cl.[7] ................................................ H04Q 7/20
(52) U.S. Cl. ...................... 455/450; 455/560; 455/452.1
(58) Field of Search ................................ 455/560, 445, 455/450, 452.1

(56) References Cited

U.S. PATENT DOCUMENTS

| | | | |
|---|---|---|---|
| 6,041,238 A | | 3/2000 | Tanoue ........................ 455/452 |
| 6,091,969 A | * | 7/2000 | Brophy et al. ............... 455/560 |
| 6,122,516 A | | 9/2000 | Thompson et al. .......... 455/450 |
| 6,272,358 B1 | * | 8/2001 | Brent et al. .................. 455/560 |
| 6,292,662 B1 | * | 9/2001 | Ziv et al. ..................... 455/445 |
| 6,363,339 B1 | * | 3/2002 | Rabipour et al. ............ 704/201 |
| 6,452,911 B1 | * | 9/2002 | Seo ............................. 370/335 |

* cited by examiner

Primary Examiner—William Trost
Assistant Examiner—Sharad Rampuria
(74) Attorney, Agent, or Firm—Baker Botts LLP

(57) ABSTRACT

The present invention is about a method for assigning channels in a mobile communication system, having the function to analyze the marginal resources according to each operation mode and thereby to maximize the efficiency of a multi-channel DSP. The present invention includes the steps of: a) checking what an input call is among the three modes of vocoding, bypass and data service; b) deciding whether there is a usable channel for the same mode as the input call requires; c) if there is a usable channel for the same mode as the input call requires, assigning the input call to a dedicated channel for the same mode as the input call requires; and d) if there is no usable channel for the same mode as the input call requires, assigning the input call to a complex channel in case that there is a usable complex channel.

5 Claims, 3 Drawing Sheets

METHOD FOR ASSIGNING CHANNEL IN MOBILE COMMUNICATION SYSTEM

FIELD OF THE INVENTION

The present invention relates to a method for assigning channel in a mobile communication system, which increases the number of usable channels using the special method of channel assigning that makes possible the efficient use of the marginal resource in a DSP.

DESCRIPTION OF THE PRIOR ART

The Digital Signal Processor (DSP) in the mobile communication system performs compression and decompression of voice, namely, vocoding. In accordance with the technological progress in the semiconductor integrated circuit, most DSP chips became to adopt the multi-channel technology that simultaneously vocodes several channels in a DSP. In the multi-channel DSP technology, the present invention brings up a method that increases the efficiency of the DSP.

FIG. 1 is a block diagram showing a conventional mobile communication system that includes a mobile station 1, a base station 2, a base station controller 3, a mobile switching center (MSC) 4, a fixed terminal 5.

In case that a mobile station subscriber starts to call a fixed terminal subscriber, after a call set-up between the two terminals, the mobile station subscriber inputs her voice into the mobile station 1. Then the mobile station 1 changes the input voice signal into Qualcomm Code Exited Linear Predictive (QCELP) data and transfers the QCELP data to a Transcoder and Selector Bank (TSB) 3' in the base station controller 3. The QCELP data is voice packet data. Next, the TSB 3' transfers the QCELP data to a vocoder 3" in the base station controller 3. The vocoder 3" decodes QCELP data to PCM (Pulse Code Modulation) data and then sends the PCM data through a mobile switching center (MSC) 4 to the fixed terminal 5. By the above process, the fixed terminal subscriber finally hears the voice inputted by the mobile station subscriber.

In the mean time, in case that a fixed terminal subscriber starts to call a mobile station subscriber, after a call set-up between the two terminals, the fixed terminal subscriber inputs her voice into the fixed terminal 5, which encodes the input voice signal to PCM data and transfers the PCM data through the MSC 4 to a vocoder 3" in the base station controller. The vocoder 3" encodes the PCM data to QCELP data and transfers the QCELP data to the mobile station 1 through a TSB 3' and a base transceiver station 2. By the above process, the mobile station subscriber finally hears the voice inputted by the fixed terminal subscriber. Even though FIG. 1 shows only a QCELP vocoding algorithm for a vocoder, the algorithm can be replaced by an Enhanced Variable Rate Coder (ECRC) vocoding algorithm.

The vocoder in FIG. 1 performs two more operations of bypass and data service in addition to vocoding, and each operation is as follows.

First, the vocoding operation is used to increase channel capacity in the Mobile Communication System. Vocoding is the operation that encodes PCM data to packet data such as QCELP and decodes packet data to PCM data. The three kinds of vocoding algorithms such as QCELP 8K, QCELP 13K and EVRC is used for Code Division Multiple Access (CDMA), and among them, EVRC that has the highest complexity is used to produce the maximum usable channels per DSP in the multi-channel DSP technology.

Second, bypass is the operation to prevent double vocoding, which performs compression and decompression twice, when a call set-up is established between two mobile stations. Because vocoding algorithms make a loss in voice quality whenever they are performed, the repetitive vocoding makes worse the quality of a decompressed voice from a compressed voice, and makes the decompressed voice different from an original voice. Therefore a compressed packet data, in the case of a call between two mobile station subscribers, is bypassed without additional compression by a vocoder 3". So the bypass operation, which decreases the repetitive use of the vocoding operation, is used to prevent voice quality from dropping off. It performs the function in less complexity (about 10% of the vocoding operation) than the vocoding operation.

Lastly, the data service operation performs an adjustment function using ISLP (Inter System Link Protocol) between a mobile station and an IWF (Inter Working Function). The data service operation performs the function in less complexity (about 30% of the vocoding operation) than the vocoding operation.

Next, the prior channel assigning method is as the following.

In the multi-channel technology, a DSP can simultaneously vocode several channels, and each channel has three operation modes of vocoding, bypass and data service. At this time, based on the vocoding mode that has the highest complexity among three operation modes, the number of the maximum usable channels is decided.

In order to set-up a call, regardless of the operation mode, the call control processor (CCP) assigns the call to a usable channel. Next, the CCP decides an operation mode for the call and inform the decision to a DSP. Then the DSP operates the mode decided by the CCP for the usable channel.

In such a multi-channel environment, the number of the maximum usable channels can be calculated under the assumption that all channels will be operated in the vocoding mode. At this time, a DSP will have a marginal resource which cannot accommodate one full vocoding channel and the marginal resource has been wasted in the prior art.

SUMMARY OF THE INVENTION

The object of the present invention is to provide a channel assigning method that increases the number of usable channels of a DSP by assigning the bypass mode and the data service mode to the marginal channel not enough to assign vocoding mode which needs more resources of DSP.

Hereinafter, the channel assigning method of the present invention is briefly explained.

The first step of the channel assigning method is to identify what an input call is among a call the requesting vocoding operation, a call requesting the bypass operation, and a call requesting the data service operation.

The second step is to decide whether there is a usable dedicated channel for the operation mode of the input call identified at the first step; (a) if there is, the input call is assigned to the dedicated channel of the same operation mode as identified at the first step; and (b) if there is not, but a complex channel is available for the call, the input call is assigned to a complex channel corresponding to the dedicated channel.

Additionally, the present invention, in case that an input call is the call requesting vocoding, has a step comparing the number of the already used complex channels to the number of maximum usable complex channels; (a) in accordance with the compared result, if the number of the maximum usable complex channels is not equal to the number of the already used complex channels, the call requesting vocoding is assigned to a complex channel; (b) if the number of the maximum usable complex channels is equal to the number of the already used complex channels, the call requesting vocoding is rejected to be assigned on a complex channel.

Next, the present invention, in case that an input call is the call requesting bypass, has a step comparing the number of the maximum usable bypass channels to the number of the already used bypass channels; (a) in accordance with the compared result, if the number of the already used bypass channels is not equal to the number of the maximum usable bypass channels, the call requesting bypass is assigned to a bypass channel; (b) if the number of the already used bypass channels is equal to the maximum usable bypass channels, the call requesting bypass, through the decision of whether a complex channel is available, is assigned to the complex channel.

Next, the present invention, in case that an input call is the call requesting data service, has a step comparing the number of the maximum usable data service channels to the number of the already used data service channels; (a) in accordance with the compared result, if the number of the already used data service channels is not equal to the number of the maximum usable data service channels, the call requesting data service is assigned to a data service channel; (b) if the numbers of the already used data service channels and the maximum usable data service channels are equal, the call requesting data service, through the decision of whether a complex channel is available, is assigned to the complex channel.

BRIEF DESCRIPTION OF THE DRAWINGS

Other objects becomes apparent from the following descriptions of the embodiments with reference to the accompanying drawings, in which.

DETAILED DESCRIPTION OF THE PREFERRED EMBODIMENTS

The present invention provides the channel assigning method for the mobile communication system, which maximizes the efficiency of the DSP by the function that analyzes the marginal resources of the DSP and uses the marginal resources.

The channel assigning method will be described below with reference to the attached figures. Before the detailed description, an example of efficient use of DSP resource will be explained.

In case of multi-channel vocoding, the number of usable vocoding channels is decided as the following.

If the total resources (MIPS: Million Instruction Per Second) of a DSP=100 MIPS; if the DSP resources (MIPS) used for the vocoding operation of one channel=21 MIPS; if the DSP resources (MIPS) used for the bypass operation of one channel=4 MIPS; and if the DSP resources (MIPS) used for the data service operation of one channel=6 MIPS, the number of maximum usable channels for the vocoding operation mode is a maximum integer satisfying the below formula 1. Because the vocoding operation requires more DSP resources (MIPS) than the other operations, the number of the maximum usable channels is calculated in the base of the vocoding operation mode.

$$\frac{\text{Total } MIPS}{MIPS \text{ for the vocoding operation of one channel} \times \text{the number of channels}} \geq 1 \quad [\text{equation 1}]$$

In accordance with the equation 1, the number of maximum usable channels that a DSP is able to process is 4 channels.

Each amount of usable resource (MIPS) and unusable resource (MIPS) of a DSP under the vocoding mode is as follows.

The usable resources (MIPS) for 4 channels=21 MIPS*4 Channels=84 MIPS

The unusable resources (or marginal resources, MIPS)= 100 MIPS−84 MIPS=16 MIPS

Because the 16 MIPS is smaller than 21 MIPS of the minimum requirement for the vocoding mode, the 16 MIPS cannot be used for the vocoding mode and it was a wasteful element that prior arts have. However, the present invention diverts the unusable resources in the prior arts for dedicated channels for the bypass mode and the data service mode, which bring an effect to increase the number of usable channels.

For example, in case that one channel of the bypass mode and one channel of the data service mode are added to the DSP, total six channels (four channels of vocoding mode+ one channel of bypass mode+one channel of data service mode) can be used by the DSP. It means that 94 MIPS out of total 100 MIPS of the DSP resource can be used. Usually, It is reasonable that about 6 MIPS of the DSP resource is remained, because a DSP software is programmed on the precondition using 90% of the DSP resource.

Additionally, according to the used proportion of each operation mode in a system, the numbers of channels for each mode can be changed.

Figure 1:
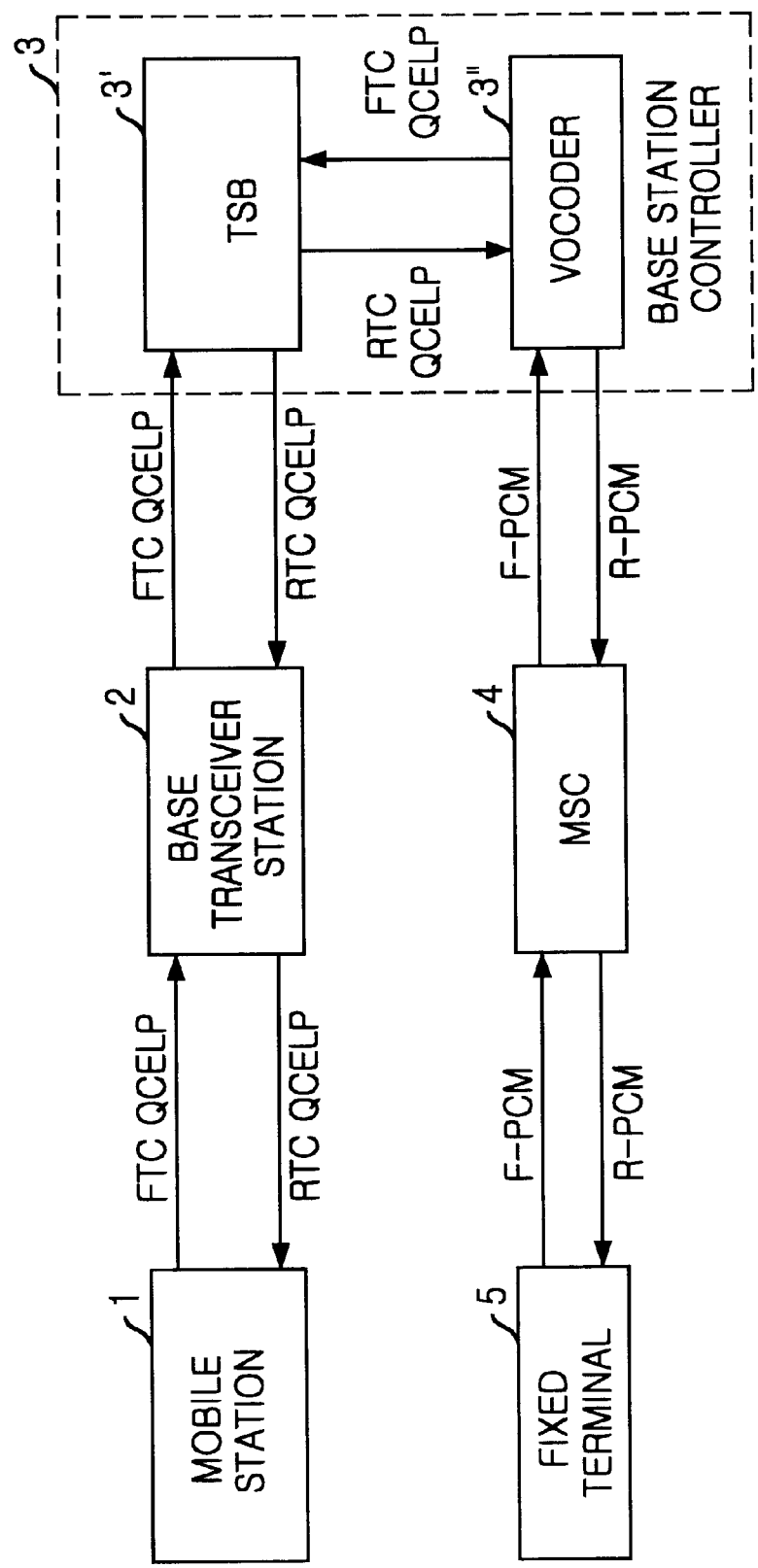
FIG. 1 is a block diagram showing the structure of a typical mobile communication system using CDMA technology.
Figure 2:
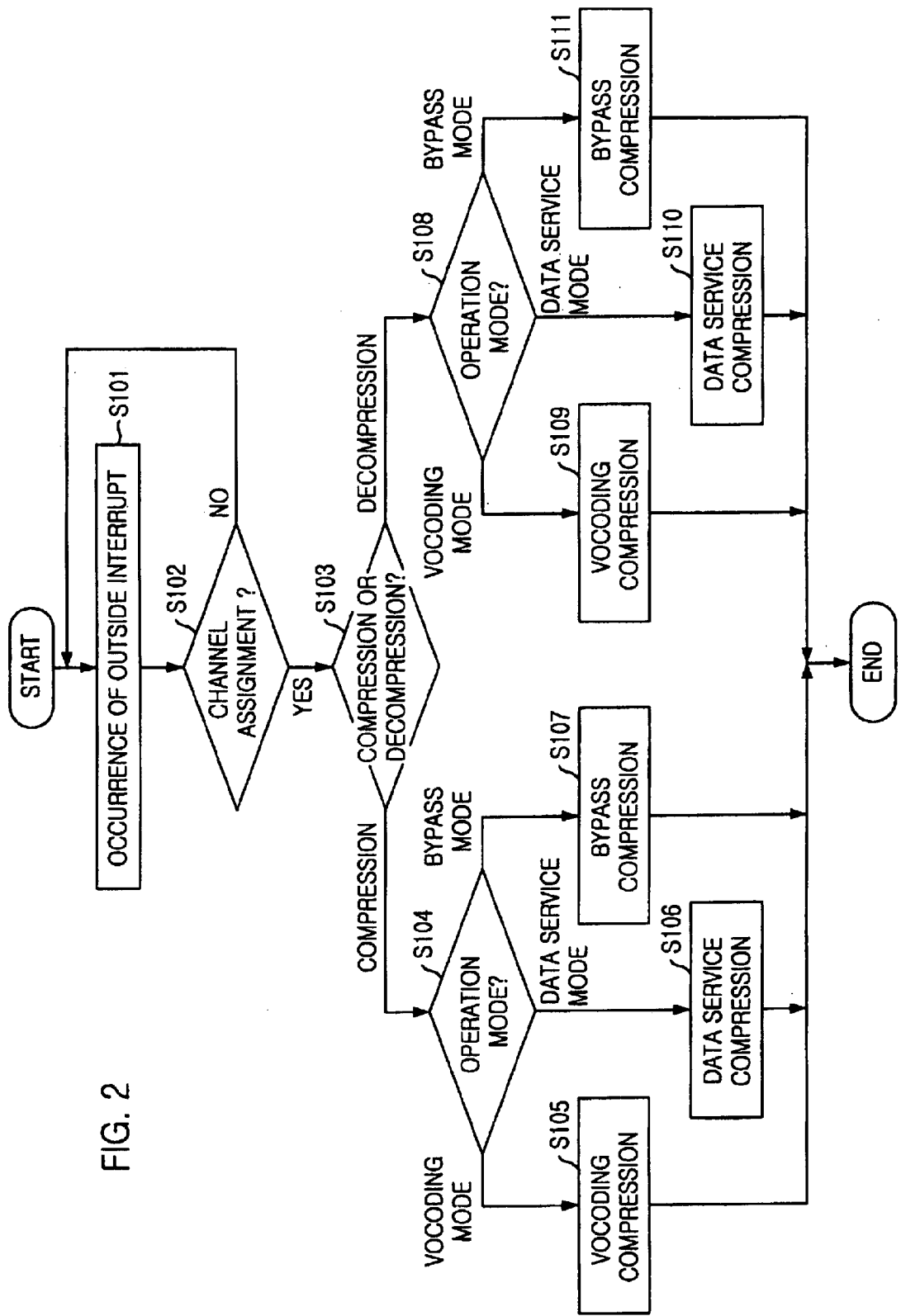
FIG. 2 is a flow chart showing the procedure to perform the vocoding operation, the data service operation and the bypass operation.

FIG. 2 shows a flow chart of the procedure to simultaneously perform, in a DSP, vocoding operation, bypass operation and data service operation.

At the beginning of the procedure, if an interrupt happens from outside at step S101, the DSP decides whether or not the channel making the interrupt is in the state assigned by one of the three operation modes at step S102.

If the channel is in the assigned state, the DSP decides whether the assigned channel is the compression mode or the decompression mode at step S103.

With the result of the step S103, if the channel is the compression mode, the DSP decides what the channel mode is among the three modes of vocoding, bypass and data service at step S104. In accordance with the decided mode, the DSP performs an operation among the vocoding compression, the bypass compression and the data service compression at step S105, S106 and S107.

In the mean time, with the result of S103, if the mode is the decompression mode, the DSP decides what the channel mode is among the three modes of vocoding, bypass and data service at step S108. In accordance with the decided mode, the DSP performs an operation among the vocoding decompression, the bypass decompression and the data service decompression at step S109, S110 and S111.

In light of the above procedure, the merit of the present invention is to increase the number of channels without any change, compared to the prior arts, in the process of the compression and decompression of vocoding, bypass and data service. That is, in the same process as the prior arts have in the vocoding operation, the bypass operation, and the data service operation, only the number of usable channels of a DSP is increased by the channel assigning method of CCP.

The channel assigning method by CCP, in case that the number of vocoding, bypass and data service channels is increased, is explained as follows.

A channel in a vocoder is assigned by CCP in a base station controller. The prior arts, in the case of channel assigning, use the method in which CCP checks the operation mode of a call and indicates to DSP one mode among vocoding, bypass and data service.

Figure 3:
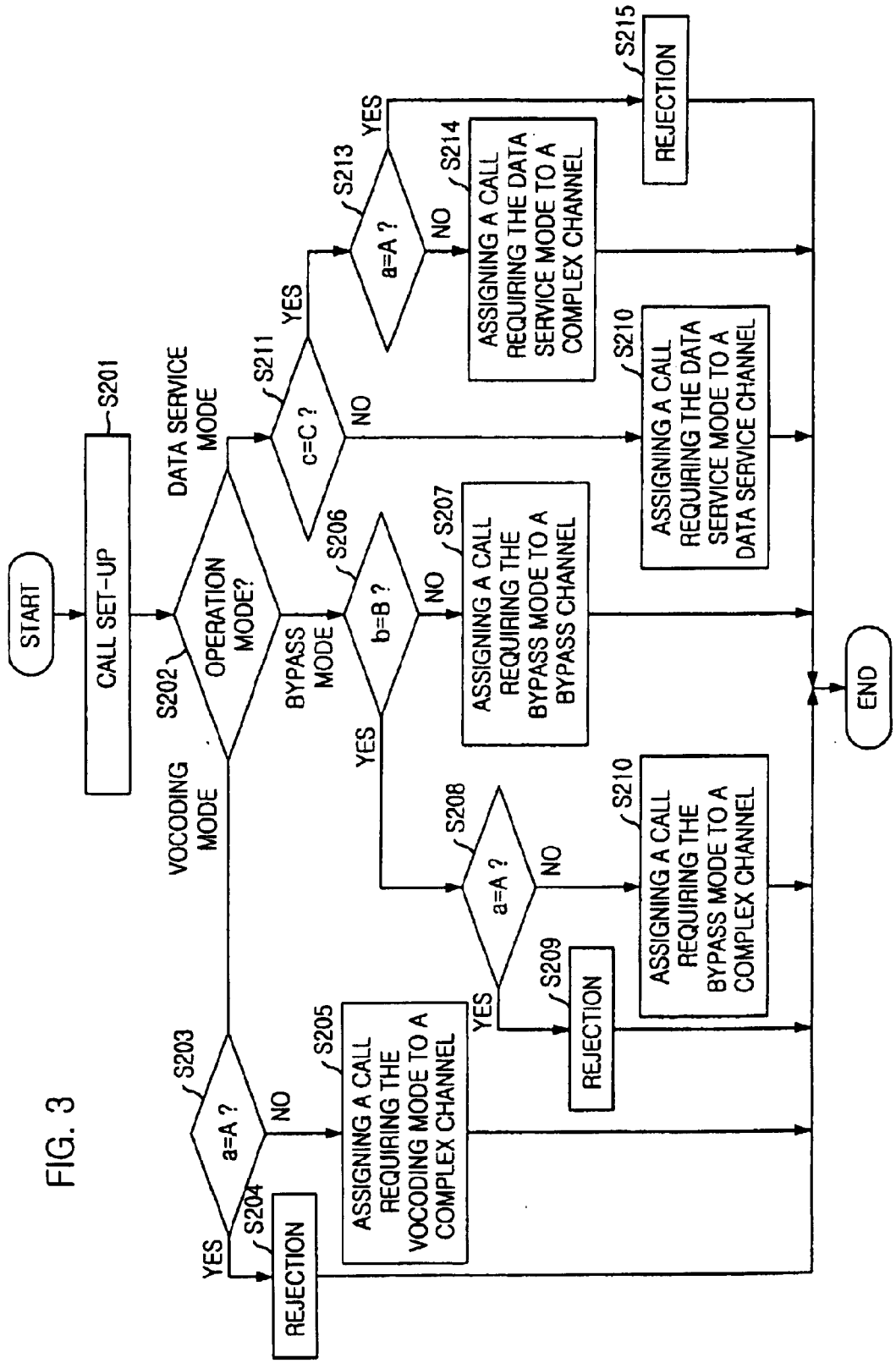
FIG. 3 is a flow chart showing the channel assigning method for a mobile communication system according to the present invention.

Hereinafter, the channel assigning method by the present invention is explained with reference to FIG. 3.

First, the channel being able to accommodate all three kinds of mode of vocoding, bypass and data service is defined as a complex channel; the channel being able to accommodate only the bypass mode is defined as a bypass channel or a dedicated bypass channel; and the channel being able to accommodate only the data service is defined as a data service channel or a dedicated data service channel.

Second, the numbers of the maximum usable channels for each complex mode, bypass mode and data service mode are respectively defined as A, B and C; and the numbers of the already used channels for each complex mode, bypass mode and data service mode are respectively defined as a, b and c.

Third, CCP should assign a channel under the following rule. That is, the maximum A+B+C of channels can be assigned for a DSP; for only bypass mode, the maximum A+B of channels can be assigned; for only data service mode, the maximum A+C of channels can be assigned. However, in any case, the maximum number of vocoding channels cannot exceed A.

The channel assigning method in accordance with the above definitions and rule is explained with reference to FIG. 3.

First, after a call set-up is completed at step S201, CCP checks the operation mode of the input call at step S202. That is, the CCP decides what the mode of the input call is among the three modes of vocoding, data service and bypass.

Second, if the result is identified as the vocoding mode, the CCP checks whether a is equal to A, namely, whether the number of the already used complex channels is equal to the number of the maximum usable complex channels at step S203.

Third, if the result is identified as the bypass mode, the CCP checks whether b is equal to B, namely, whether the number of the already used bypass channels is equal to the number of the maximum usable bypass channels at step S206.

Fourth, if the result is identified as a data service mode, the CCP checks whether c is equal to C, namely, whether the number of the already used data service channels is equal to the number of the maximum usable data service channels at step S211.

Fifth, at the step S203, if a is equal to A, namely, if all the complex channels are already full, the channel assigning requirement for the vocoding mode is rejected at step S204. However, if a is not equal to A, a call requesting a vocoding channel is assigned to a complex channel at step S205.

Sixth, at the step of S206, if b is not equal to B, a call requesting a bypass channel is assigned to a bypass channel.

Otherwise, if b is equal to B, namely, if all bypass channels are already full, the CCP decides whether a is equal to A at step S208. With the result of the decision, if a is equal to A, the channel assigning requirement for the bypass mode is rejected. However, if a is not equal to A, a call requesting a bypass channel is assigned to a complex channel.

Seventh, at the step S202, if c is not equal to C, a call requesting a data service channel is assigned to a data service channel.

Otherwise, if c is equal to C, namely, if all data service channels are already full, the CCP decides whether a is equal to A at step S213. With the result of the decision, if a is equal to A, the channel assigning requirement for the data service mode is rejected. However, if a is not equal to A, a call requesting a data service channel is assigned to a complex channel at step S214.

In brief, in case that an input call is a call requesting the vocoding mode, the call is assigned to a complex channel. But, if all the complex channels are already full, the vocoding channel assigning requirement is rejected.

Next, in case that an input call is a call requesting the bypass mode, the call is assigned to a bypass channel. But, if all the bypass channels are already full, the call is assigned to a complex channel except to the case that all the complex channels also are already full.

Next, in case that an input call is a call requesting the data service mode, the call is assigned to a data service channel. But, if all the data service channels are already full, the call is assigned to a complex channel except to the case that all the complex channels also are already full.

In the result, while the prior channel assigning method can assign the maximum A of channels per DSP, the method in the present invention can assign the maximum A+B+C of channels per DSP.

The present invention can be applied to increase the usable channel number not only for a vocoder, but also for other devices having marginal resources, by the software that is operated in the multi-channel circumstances.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for assigning a channel in the mobile communication system, comprising the steps of:

a) determining a mode of an input call among a vocoding call, a bypass call and a data service call;

b) determining whether there is a usable channel of a mode same as the mode of input call in a digital signaling processor DSP;

c) if there is a usable channel of the mode same as the mode of the input call in the DSP, assigning the input call to a dedicated channel of the same mode in a digital signaling processor DSP by a call control processor CCP; and d) if there is no usable channel of the mode same as the mode of the input call in the DSP, assigning the input call to a complex channel in a digital signaling processor DSP by a call control processor CCP in case that there is a usable complex channel in a digital signaling processor DSP.

2. The method as recited in claim 1, comprising the steps of:

e) in case that an input call is a call that requires vocoding, comparing the number of the already used complex channels to the maximum number of usable complex channels;

f) if the maximum number of usable complex channels is not equal to number of already used complex channels, assigning the call requesting vocoding to a complex channel; and g) if the maximum number of able complex channels is equal to the number of already used complex channels, rejecting to assign the call requesting vocoding to a complex channel.

3. The method as recited in claim 1, comprising the steps of:

h) in case that an input call is a call requesting bypass, comparing the maximum number of usable bypass channels to the number of already used bypass channels;

i) if the number of already used bypass channels is not equal to the maximum number of usable bypass channels, the call requesting bypass is assigned to a bypass channel;

j) if the number of already used bypass channels is equal to the maximum number of usable bypass channels, deciding whether or not a complex channel is available; and k) if available, assigning the call requesting bypass to the available complex channel.

4. The method as recited in claim 1, further comprising the steps of:

l) in case that an input call is a call requesting data service, comparing the maximum number of usable data service channels to the number of the already used data service channels;

m) if the number of the already used data service channels is not equal to the maximum number of usable data service channels, assigning the call requesting data service to a data service channel;

n) if the number of the already used data service channels is equal to the maximum number of usable data service channels, deciding whether or not a complex channel is available; and o) if available, assigning the call requesting data service to the available complex channel.

5. The method as recited in claim 1, wherein the sum of the maximum usable channels for the vocoding mode, the bypass mode and the data service mode is the total number of usable channels for the DSP; the sum of the maximum number of usable channels for the vocoding mode and the bypass mode is the total number of usable channels for the bypass mode; the sum of the maximum number of usable channels for the vocoding mode and the data service mode is the total number of usable channels for the data service mode; and the total number of usable channels for the vocoding mode cannot exceed the maximum number of usable channels.

* * * * *